(12) United States Patent
Shao et al.

(10) Patent No.: US 7,302,463 B1
(45) Date of Patent: Nov. 27, 2007

(54) SHARING INFORMATION ACROSS WIRELESS CONTENT PROVIDERS

(75) Inventors: Victor Shao, Redwood City, CA (US); Rushan Jiang, Redwood Shores, CA (US); Michael McGee, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 955 days.

(21) Appl. No.: 09/729,810

(22) Filed: Dec. 4, 2000

(51) Int. Cl.
*G06F 15/16* (2006.01)
*G06F 15/173* (2006.01)

(52) U.S. Cl. .................. 709/203; 709/223; 709/26; 709/229

(58) Field of Classification Search ........ 709/200–203, 709/227–229; 705/1, 26, 27, 39, 41; 715/505, 715/507
See application file for complete search history.

(56) References Cited

U.S. PATENT DOCUMENTS

| | | | |
|---|---|---|---|
| 5,564,070 A | | 10/1996 | Want et al. |
| 5,715,399 A | * | 2/1998 | Bezos .................... 705/27 |
| 5,960,411 A | * | 9/1999 | Hartman et al. ........... 705/26 |
| 6,125,352 A | * | 9/2000 | Franklin et al. ........... 705/26 |
| 6,192,380 B1 | * | 2/2001 | Light et al. ............... 715/505 |
| 6,199,079 B1 | * | 3/2001 | Gupta et al. .............. 715/507 |
| 6,304,898 B1 | | 10/2001 | Shiigi |
| 6,341,353 B1 | * | 1/2002 | Herman et al. ............ 713/201 |
| 6,378,075 B1 | * | 4/2002 | Goldstein et al. .......... 713/200 |
| 6,421,693 B1 | * | 7/2002 | Nishiyama et al. ........ 715/507 |
| 6,457,045 B1 | | 9/2002 | Hanson et al. |
| 6,477,504 B1 | | 11/2002 | Hamlin et al. |
| 6,535,885 B1 | | 3/2003 | Nardone et al. |
| 6,601,761 B1 | * | 8/2003 | Katis ....................... 235/379 |

(Continued)

FOREIGN PATENT DOCUMENTS

WO    WO 00/03554 A1    1/2000

(Continued)

OTHER PUBLICATIONS

Yahoo!; What is Yahoo! Wallet?; Oct. 18th, 2000; Retreived from the Internet Archives (http://www.archive.org) at http://web.archive.org/web/20001018070000/help.yahoo.com/help/wallet/wallet-07.html.*

(Continued)

*Primary Examiner*—Quang N. Nguyen
(74) *Attorney, Agent, or Firm*—Hickman Palermo Truong & Becker LLP

(57) ABSTRACT

An improved mechanism for sharing information across a plurality of wireless content providers is disclosed. Users make requests for, and display, content through a mobile device. These requests for content are translated by a WAP gateway and sent to a web server to service the request. Data from the request for content that can be reused is stored externally to a mobile device. Upon a request for content, the user may, in lieu of manual entry, select from a list of data presented through a mobile device that will be used in servicing the request for content. Data manually entered or displayed in a mobile device in interacting with one content provider is available for selection in subsequent content requests with any content provider. By reducing the number of manual entries, the present invention significantly increases the usability of content services through mobile devices.

30 Claims, 2 Drawing Sheets

U.S. PATENT DOCUMENTS

| | | | |
|---|---|---|---|
| 6,615,131 | B1 | 9/2003 | Rennard et al. |
| 6,618,746 | B2 | 9/2003 | Desai et al. |
| 6,651,217 | B1 * | 11/2003 | Kennedy et al. ............ 715/507 |
| 6,668,167 | B2 | 12/2003 | McDowell et al. |
| 6,701,366 | B1 | 3/2004 | Kallas et al. |
| 6,748,449 | B1 | 6/2004 | Dutta |
| 6,754,635 | B1 | 6/2004 | Hamlin et al. |
| 6,826,540 | B1 | 11/2004 | Plantec et al. |
| 2001/0011250 | A1 * | 8/2001 | Paltenghe et al. ............ 705/41 |
| 2001/0011274 | A1 * | 8/2001 | Klug et al. .................... 707/9 |
| 2001/0025245 | A1 * | 9/2001 | Flickinger et al. ............. 705/1 |
| 2001/0027439 | A1 * | 10/2001 | Holtzman et al. ............ 705/39 |
| 2001/0047292 | A1 | 11/2001 | Montoya |
| 2001/0052122 | A1 | 12/2001 | Nanos et al. |
| 2002/0004783 | A1 * | 1/2002 | Paltenghe et al. ............ 705/41 |
| 2002/0007303 | A1 | 1/2002 | Brookler et al. |
| 2002/0052774 | A1 | 5/2002 | Parker et al. |
| 2002/0059218 | A1 | 5/2002 | August |
| 2002/0065774 | A1 * | 5/2002 | Young et al. ................. 705/41 |
| 2002/0073166 | A1 | 6/2002 | Lynch |
| 2002/0107726 | A1 | 8/2002 | Torrance |
| 2004/0024656 | A1 | 2/2004 | Coleman |
| 2004/0043770 | A1 | 3/2004 | Amit |

FOREIGN PATENT DOCUMENTS

| | | |
|---|---|---|
| WO | WO 01/10080 A2 | 2/2001 |
| WO | WO 01/43390 A2 | 6/2001 |

OTHER PUBLICATIONS

Just Deals.com; Order Confirmation; Retreived from http://weinbeck.mit.edu/keyboard.pdf.*

Boulton, Clint; Yahoo! Moves to Speed Checkout; Oct. 5th, 1999; http://www.internetnews.com/ec-news/article.php/212081.*

Crouch, Cameron; Yahoo Shopping Goes Express; Oct. 6th, 1999; PC World.*

Barnett, Megan; 1999: Year of the E-Wallet; Jun. 30th, 1999; PC World.*

Yahoo Media Relations; Yahoo! Makes Online Shopping Easier for Consumers; Oct. 5th, 1999; Yahoo Press Release.*

Yahoo Media Relations; Yahoo! Shopping Now Available on Web-Enabled Phones; Nov. 22nd, 2000; Yahoo Press Release.*

Patterson et al.; Computer Organization & Design: The Hardware/Software Interface; 1998; Morgan Kaufmann Publishers, Inc.; Second Edition; pp. 575-576.*

Yahoo!; What is Yahoo!; Oct. 18th, 2000; Retreived from the Internet Archives (http://www.archive.org) at http://web.archive.org/web/20001018070000/help.yahoo.com/help/wallet/wallet-07.html.*

Just Deals.com; Order Confirmation; Retreived from http://weinbeck.mit.edu/keyboard.pdf, date unknown.*

Christer Erlandson, et al., "WAP—The wireless application protocol," Ericsson Review No. 4, 1998, XP-000792053, pp. 150-153.

State Intellectual Property Office of P.R.C., "Notification of the First Office Action," Application No. 02814466.X, dated Jul. 22, 2005, 4 pages.

Current Claims, Application No. 02814466.X, Claims 1-24, 4 pages.

State Intellectual Property Office of P.R.C., "Notification of the First Office Action," Application No. 02814466.X, dated Jul. 22, 2005, 4 pages.

Current Claims, Application No. 02814466.X, Claims 1-24, 4 pages, date unknown.

* cited by examiner

SHARING INFORMATION ACROSS WIRELESS CONTENT PROVIDERS

FIELD OF THE INVENTION

This invention relates generally to communication systems, and more particularly to a mechanism for sharing information across a plurality of content providers over a wireless connection to a mobile device.

BACKGROUND OF THE INVENTION

The use of wireless technology has quickly become an accepted and popular method of enabling communication. Many enjoy mobile devices for the convenience of engaging in conversation from any location. Wireless carriers, in addition to offering voice communication, have begun to provide a variety of content services to provide information from a variety of sources. These content providers, in many cases, extend the capability of Internet applications to the wireless environment. For example, many people access the Internet through a cell phone to obtain stock quotes or driving directions, or use a personal digital assistant to obtain weather reports or access local yellow pages.

Unfortunately, due to several limitations, entering information through a mobile device is generally awkward and inconvenient. Due to the portable nature of mobile devices, most are not large enough to accommodate a keyboard, which makes entering information slow and cumbersome. Also, even after information is entered, it cannot easily be reused. Additionally, information retrieved from one content provider is not easily made available for use by another content provider.

For example, assume that you wish to find a restaurant for dinner and a nearby theatre for a show. Using your web-enabled cell phone, you may browse through a restaurant content provider to select a particular restaurant. To obtain driving directions to your selected restaurant from your current location, you must manually enter in your current location to the restaurant content provider. To find a theatre near your selected restaurant, you must access a theatre content provider and make a second manual entry in the theatre content provider of the address of your selected restaurant. Note that you must enter in the name or location of your selected restaurant even though that information was just presented to you by the restaurant content provider. Further, to generate driving directions from the theatre back to your current location, you will need to make a third manual entry of the address of your current location. Note that it is necessary to reenter your current address even though it has already been entered once before.

This process requires a significant amount of manual entry, as there is no mechanism for storing information manually entered or generated from a content provider for use with another. As manually entering information through a mobile device is a time intensive and repetitive act, it is clearly desirable to minimize data entry through a mobile device as much as possible. However, there is currently no effective mechanism to do so.

SUMMARY

To overcome the shortcomings of the prior art, an improved mechanism is provided for sharing information across a plurality of content services provided over a wireless connection to a mobile device. According to one aspect of the present invention, data that was previously used or accessed through a mobile device is stored electronically as "data records" at a location external to the mobile device. Metadata is also stored to associate the data records that contain data previously used by a particular mobile device with that particular mobile device.

When service from a content provider is requested that requires input data through the mobile device, the user may, in lieu of manual entry, select from a list of data items, where the data items in the list are retrieved from the data records associated with the mobile device. Preferably, the list includes only those data items from the data records that correspond to the type of input data required by the service. In one embodiment, the user manually specifies which data is to be pre-stored in the data records. In another embodiment, the data records are generated and stored dynamically in response to interaction with the mobile device.

By storing data received from some content providers and presenting it as an option to a user upon initiating a request for service from other content providers, the need by the user to manually enter the same input data repeatedly through a mobile device is eliminated. Additionally, information retrieved from one content service is made available to another content service, thus further reducing manual entry. By reducing the number of manual entries, the present invention significantly increases the usability of content services through mobile devices. Hence, the present invention represents a significant improvement over the prior art.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENT(S)

Techniques are provided that allow users of mobile devices to avoid re-entering input that they have previously entered, or that they have previously been provided by a service. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
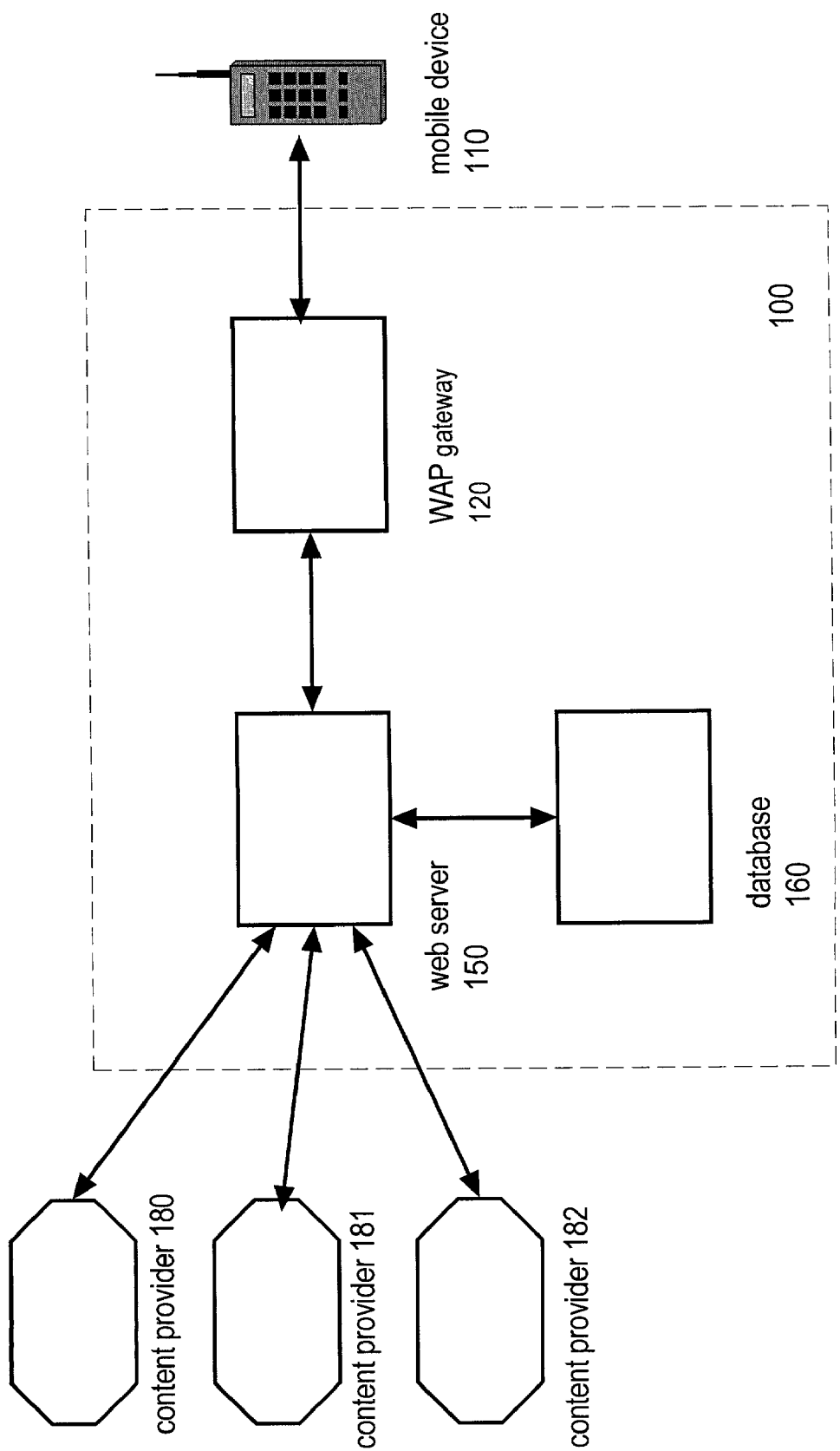
FIG. 1 a functional block diagram of a system 100 in which one embodiment of the present invention may be implemented.

With reference to FIG. 1, there is shown a functional block diagram of a system 100 in which one embodiment of the present invention may be implemented. The system 100 includes a WAP gateway 120, a web server 150, and a database 160. The system 100 is coupled to a mobile device 110 and content providers 180, 181, and 182. For the sake of simplicity, only one mobile device 110 is shown; however, it should be noted that multiple mobile devices 110 may be coupled to, and communicate with, the WAP gateway 120.

Mobile device 110 generally represents any mechanism capable of communicating over a wireless connection. Such mobile devices include, but are not limited to, cell phones, two-way pagers, and personal digital assistances. The mobile device 110 may present information using any known protocol, including but not limited to WML, HDML, and PQA. The mobile device 110 may communicate with the WAP gateway 120 using any known protocol, including but not limited to WTP ("wireless transfer protocol").

The WAP gateway 120 is the component of system 100 responsible for translating between the communication protocols used by the mobile device 110 and the web server 150. More specifically, the WAP gateway 120 sends and receives information from the web server 150 in one protocol, and sends and receives information from the mobile device 110 in another protocol. In one embodiment, the WAP gateway 120 communicates to the web server 150 over a physical connection, and communicates to a mobile device 110 over a wireless connection. The WAP gateway 120 may communicate with the web server 150 using any known protocol, including but not limited to HTTP.

The web server 150 is the component of system 100 responsible for receiving and servicing requests from mobile device 110 for specific content. This content may be derived by accessing static files, processing server-parsed entities, executing one or more applications, or by accessing content providers 180, 181, 182.

The web server 150 is coupled to database 160. The database 160 generally represents any entity capable of storing and retrieving information. The web server 150 may communicate with the database 160 using any known protocol, including but not limited to SQL.

The content providers 180, 181, 182 provide information about a variety of topics. More specifically, the content providers 180, 181, 182 may generate specific content based upon data received as input. For example, a content provider might provide weather forecasts. Upon receipt of an address, that content provider could provide a specific weather forecast for a region associated with that particular address. For the sake of explanation, only three content providers 180, 181, 182 are shown; however, it should be noted that any number of content providers 180, 181,182 may be coupled to, and communicate with, the web server 150. The content providers 180, 181, 182 may communicate with the web server using any known protocol, including but not limited to HTTP.

Functional Overview

In one embodiment, the web server 150 receives content from the content providers 180, 181, 182 in response to requests from mobile device 110, and delivers the content (or a subset thereof) to mobile device 110. During this process, the web server 150 may generate and store in database 160 one or more data records based on the received content. The requests from mobile device 110 may also supply input required by a particular service. The web server 150 is configured to generate and store in database 160 one or more data records based on such input. When the user of mobile device 110 is required by a service to enter input data, the user may be presented with a list of data items retrieved from the data records stored in database 160 that are associated with the mobile device 110. Rather than manually enter the data, the user may select a data item from the list. In response to such a selection, the web server 150 sends the data item to the service.

Generating Records from Provided Content

The content received from content providers 180, 181 and 182 in response to requests from mobile device 110 is referred to herein as "provided content". According to one embodiment, web server 150 is configured to extract data items from the provided content, and to store the data items in data records within database 160. Metadata is also generated to associate those data records with mobile device 110.

For example, in one embodiment the content received from the content providers is in XML format, or is converted to XML format. In such an embodiment, the web server 150 identifies, within the provided content, data items of relevant content by examining the XML tags within the provided content. For example, if content generated by a content provider 180 contains an address, then within that provided content the address is labeled using appropriate XML tags. Those XML tags may be used by web server 150 to identify what portions of the provided content constitute an address. Address information may be one type of data that web server 150 is configured to store in the data records. Thus, in response to retrieving provided content that includes an address from a content provider, web server 150 may generate and store a data record that contains the address.

As shall be described in greater detail hereafter, storing data items extracted from provided content from one content provider allows the same data items to be resubmitted as user input to other content providers.

Generating Records from Input Data

As previously mentioned, the content providers 180, 181, 182 may generate specific content based upon input data. All input data has a particular type. In the example of a weather information provider, the type of the input data may be an address, and the information provided by the service might be a specific weather forecast for a region associated with the address. In another example, a content provider may provide stock quotes, in which case, the input data type may be a stock symbol.

According to one embodiment, the web server 150 stores input data sent to content providers 180, 181, 182 in data records within the database 160, along with a user identifier and the input data type. In one embodiment, the user identifier may identify a particular user of the system 100 who sent the input data. In another embodiment, the user identifier may identify a particular mobile device 110 that sent the input data.

Additionally, a user of the system 100 may populate the database 160 directly with input data, an identifier, and input data type. The database 160 could be populated through a standard graphical user interface, such as a web page, and would advantageously allow a user to store input data (presumably using a device with a sophisticated data input mechanism) that the user believes that she may later want to submit to a service accessed using the mobile device.

Database Policies

If data records are generated every time a user accesses a particular service and the data records are never deleted, then database 160 will quickly become unacceptably large. Therefore, according to one embodiment, system 100 implements a policy for limiting the number of data records stored for any given user. The particular policy implemented by system 100 may vary from, implementation to implementation.

For example, a limit may be set for on the amount of input data stored in the database 160 per input data type or user identifier as necessary, to accommodate the storage capacity of the database 160. Alternatively, the database 160 may be configured to store only a predetermined number of most recently generated data records for a particular input data type or user identifier. This would provide a mechanism in which old input data would expire and be removed from further consideration. Further, the database 160 may be configured to permanently store certain input data for a user identifier. This would be advantageously enable a user to configure particular input data that is not likely to change, for example an address for a permanent residence, a home phone number, username, or credit card number. Storing input data in the database 160 provides for greater efficiency when a user makes a request using input data already stored in the database 160, as the user no longer needs to manually enter input data.

Using Data Items from the Records as User Input

When a user of the system 100 makes a request for content through a mobile device 110, the web server 150 determines how to service the request. If the web server 150 determines a particular content provider 180 is required to service the request, then the web server 150 determines whether the content provider 180 requires input data. If the content provider 180 does not require input data, then web server 150 retrieves the requested content from the content provider 180.

If the content provider 180 requires input data, then the web server 150 determines the type of input data required by the content provider 180. The web server 150 transmits to the mobile device 110 a request for input data of the type required by the content provider 180. In addition, if the type of input data matches the input type of any data records associated with mobile device 110 that are stored in the database 160, then web server 150 sends mobile device 110 a list of data items from those records.

For example, if a content provider 180 provides stock quotes, and database 160 contains records for mobile device 110 that are of a "stock symbol" type, then the web server 150 would transmit to mobile device 110 a list of data items from those records. The mobile device 110 presents to the user a list from which the user may select input data in requesting service from the content provider 180. As a mobile device 110 may be of a variety of shapes and sizes, and thus have a variety of sized viewing areas, the full list of data items available may not all be immediately visible to the user. Accordingly, the user may scroll through the list of data items using the mobile device 110. The data item selected from the list is sent to the web server 150 to process the request for service from the content provider 180 as if the user had manually entered the data item.

This arrangement is advantageous, as the user no longer has to enter in the same input data more than once. Once entered, the particular input data is stored in the database 160, and may be selected by the user when needed. Additionally, any input data is stored dynamically upon retrieval from the content providers 180, 181, 182, and thus input data is available for selection in the list of data items displayed in the mobile device 110 without ever having been entered by the user.

Hardware Overview

Figure 2:
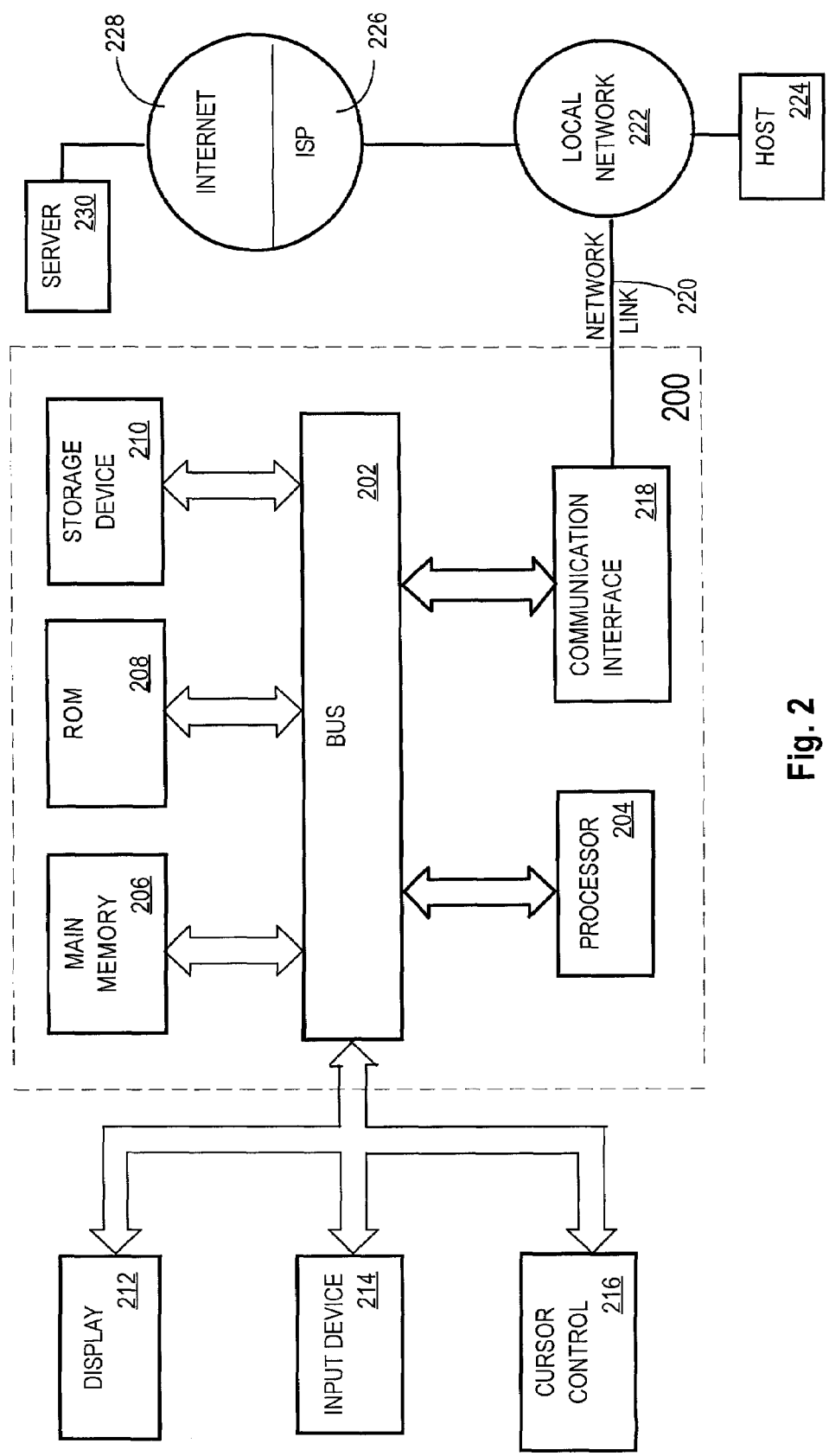
FIG. 2 is a block diagram that illustrates a computer system 200 upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for generating a digital video content. According to one embodiment of the invention, a digital video content is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The execution of the sequences of instructions required to practice the invention need not be performed by a single computer system 200. The sequences of instructions required to practice the invention may be performed by a plurality of computer systems 200 connected to local network 222, connected to the Internet 228, or otherwise in data communication with each other.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 1128. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit requested program code for an application program through Internet 228, ISP 226, local network 222 and communication interface 218

Processor 204 may execute the received code as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for reducing user input required to access a plurality of services provided to a device, comprising:
a web server storing in a database, external to said device and separate from a first service of the plurality of services, data records containing a plurality of data items associated with a particular type of information, wherein the step of storing said data records comprises:
said web server receiving content from said first service in response to being requested by the device;
said web server parsing the content and identifying one or more data items associated with said particular type of information; and
said web server generating and storing in said database one or more data records that contain said one or more data items associated with said particular type of information;
said web server receiving a first message from said device requesting a second service, wherein said second service requires said particular type of information for input;
said web server reading said data records from said database and transmitting data from said data records to said device to cause said device to present a user interface that presents a set of data items associated with said particular type of information, wherein said set of data items includes said one or more data items associated with said particular type of information;
said web server receiving a second message indicating a selection from said device of a particular data item from said set of data items; and
said web server sending said particular data item to said second service of said plurality of services.

2. The method of claim 1, wherein:
the step of receiving content includes receiving content requested in messages from said device;
said messages contain a particular identifier; and
the step of storing said one or more data records includes storing data records that are associated with said particular identifier.

3. The method of claim 1, wherein the step of storing said one or more data records containing said data items is performed transparent to a user of said device.

4. The method of claim 1, further comprising the step of deleting existing data records in response to storing said one or more data records when an amount associated with said data records reaches a predetermined threshold.

5. The method of claim 4, further comprising the step of selecting which existing data records to delete based on a sequence associated with said existing data records.

6. The method of claim 5, wherein said sequence reflects when data items within said existing data records were most recently selected.

7. The method of claim 5, wherein said sequence reflects when said existing data records were generated.

8. The method of claim 1, wherein:
the content includes tags; and
the step of identifying, within said content, data items associated with said particular type of information is performed based on said tags.

9. The method of claim 1, wherein the step of transmitting data to said device to cause said device to present a user interface includes transmitting data to said device to cause said device to present a user interface that displays a first subset of said plurality of data items.

10. The method of claim 9, further comprising the step of transmitting data to said device to cause said device to present an option for causing said list to be updated to display a second subset of said plurality of data items.

11. The method of claim 1, wherein said particular data item identifies a particular address.

12. The method of claim 1, wherein
said data records are stored in a database with data that associates the data records with an identifier,
the method includes the steps of
extracting the identifier from said first message; and
locating said data records based on said identifier.

13. The method of claim 1, wherein said step of storing said data records further comprises:
receiving data items associated with said particular type of information from said device; and
storing said plurality of data items received from said device.

14. The method of claim 1, wherein
the data records are stored on a server;
the device is connected to the server through a connection that includes at least a portion that is wireless; and
said step of storing said data records further comprises
receiving data items associated with said particular type of information from a second device that is connected to said server with a connection that is not wireless; and
storing said plurality of data items with an identifier associated with said device.

15. The method of claim 1, wherein:
the step of storing data records containing a plurality of data items associated with a particular type of information includes storing a particular data record that contains one or more values previously provided to said device by a second service that is different from said first service; and
the step of sending said particular data item to said first service includes sending to said first service a value read from said particular data record.

16. A computer-readable medium storing instructions thereon for reducing user input required to access a plurality of services provided to a device, wherein the computer-readable medium consists of at least one of volatile memory and non-volatile memory, the instructions comprising instructions for performing the steps of:
a web server storing in a database, external to said device and separate from a first service of the plurality of services, data records containing a plurality of data items associated with a particular type of information, wherein the step of storing said data records comprises:
said web server receiving content from said first service in response to being requested by the device;
said web server parsing the content and identifying one or more data items associated with said particular type of information; and
said web server generating and storing in said database one or more data records that contain said one or more data items associated with said particular type of information;
said web server receiving a first message from said device requesting a second service, wherein said second service requires said particular type of information for input;
said web server reading said data records from said database and transmitting data from said data records to said device to cause said device to present a user interface that presents a set of data items associated with said particular type of information, wherein said set of data items includes said one or more data items associated with said particular type of information;
said web server receiving a second message indicating a selection from said device of a particular data item from said set of data items; and
said web server sending said particular data item to said second service of said plurality of services.

17. The computer-readable medium of claim 16, wherein:
the step of receiving content includes receiving content requested in messages from said device;
said messages contain a particular identifier; and
the step of storing said one or more data records includes storing data records that are associated with said particular identifier.

18. The computer-readable medium of claim 16, wherein the step of storing said one or more data records containing said data items is performed transparent to a user of said device.

19. The computer-readable medium of claim 16, further comprising instructions for performing the step of deleting existing data records in response to storing said one or more data records when an amount associated with said data records reaches a predetermined threshold.

20. The computer-readable medium of claim 19, further comprising instructions for performing the step of selecting which existing data records to delete based on a sequence associated with said existing data records.

21. The computer-readable medium of claim 20, wherein said sequence reflects when data items within said existing data records were most recently selected.

22. The computer-readable medium of claim 20, wherein said sequence reflects when said existing data records were generated.

23. The computer-readable medium of claim 16, wherein:
the content includes tags; and
the step of identifying, within said content, data items associated with said particular type of information is performed based on said tags.

24. The computer-readable medium of claim 16, wherein the step of transmitting data to said device to cause said device to present a user interface includes transmitting data to said device to cause said device to present a user interface that displays a first subset of said plurality of data items.

25. The computer-readable medium of claim 24, further comprising instructions for performing the step of transmitting data to said device to cause said device to present an option for causing said list to be updated to display a second subset of said plurality of data items.

26. The computer-readable medium of claim 16, wherein said particular data item identifies a particular address.

27. The computer-readable medium of claim 16, wherein said data records are stored in a database with data that associates the data records with an identifier, the computer-readable medium includes instructions for performing the steps of extracting the identifier from said first message; and locating said data records based on said identifier.

28. The computer-readable medium of claim 16, wherein said step of storing said data records further comprises:

receiving data items associated with said particular type of information from said device; and storing said plurality of data items received from said device.

29. The computer-readable medium of claim 16, wherein the data records are stored on a server;

the device is connected to the server through a connection that includes at least a portion that is wireless; and said step of storing said data records further comprises receiving data items associated with said particular type of information from a second device that is connected to said server with a connection that is not wireless; and storing said plurality of data items with an identifier associated with said device.

30. The computer-readable medium of claim 16, wherein:

the step of storing data records containing a plurality of data items associated with a particular type of information includes storing a particular data record that contains one or more values previously provided to said device by a second service that is different from said first service; and the step of sending said particular data item to said first service includes sending to said first service a value read from said particular data record.

* * * * *

UNITED STATES PATENT AND TRADEMARK OFFICE
CERTIFICATE OF CORRECTION

PATENT NO. : 7,302,463 B1
APPLICATION NO. : 09/729810
DATED : November 27, 2007
INVENTOR(S) : Shao et al.

It is certified that error appears in the above-identified patent and that said Letters Patent is hereby corrected as shown below:

On the face page, in field (56), under "Other Publication", in column 2, line 1, delete "Retreived" and insert -- Retrieved --, therefor.
On page 2, under "Other Publications", in column 1, line 1, delete "Retreived" and insert -- Retrieved --, therefor.
On page 2, under "Other Publications", in column 1, line 2, delete "pdf." and insert -- pdf, date unknown. --, therefor.
On page 2, under "Other Publications", in column 2, lines 14-17, below "576.*" delete "Yahool; What is Yahoo!; Oct. 18th, 2000; Retreived from the Internet Archives (http://www.archive.org) at http://web.archive.org/web/20001018070000/help.yahoo.com/help/wallet/wallet-07.html. *".
On page 2, under "Other Publications", in column 2, lines 18-19, above "Christer" delete "Just Deals.com; Order Confirmation; Retreived from http://weinbeck.mit.edu/keyboard.pdf, date unknown.*".
On page 2, under "Other Publications", in column 2, line 26, delete "pages." and insert -- pages, date unknown. --, therefor.
On page 2, under "Other Publications", in column 2, lines 27-29, below "pages." delete "State Intellectual Property Office of P.R.C., "Notification of the First Office Action," Application No. 02814466.X, dated Jul. 22, 2005, 4 pages.".
On page 2, under "Other Publications", in column 2, lines 30-31, below "pages." delete "Current Claims, Application No. 02814466.X, Claims 1-24, 4 pages, date unknown.".
In column 4, line 66, delete "from," and insert -- from --, therefor.
In column 7, line 65, after "218" insert -- . --.

Signed and Sealed this

Seventeenth Day of March, 2009

JOHN DOLL
*Acting Director of the United States Patent and Trademark Office*